(12) United States Patent
Lipke et al.

(10) Patent No.: US 6,938,940 B1
(45) Date of Patent: Sep. 6, 2005

(54) OVERHEAD STORAGE ASSEMBLY

(75) Inventors: Clarence P. Lipke, Fenton, MI (US); Laurent R. Gaudreau, North Berwick, ME (US); Erik Richard Davis, Oak Park, MI (US); Robert F. McBeth, Rochester, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/709,143

(22) Filed: Apr. 15, 2004

(51) Int. Cl.[7] ............................................. B60N 3/12
(52) U.S. Cl. ................................... 296/37.7; 296/37.8
(58) Field of Search .............................. 296/37.7, 37.8, 296/37.1

(56) References Cited

U.S. PATENT DOCUMENTS

| | | | |
|---|---|---|---|
| 5,020,845 A | * 6/1991 | Falcoff et al. | ............. 296/37.7 |
| 5,310,234 A | * 5/1994 | Klein | ......................... 296/37.7 |
| 6,331,026 B1 | 12/2001 | Adsit et al. | |
| 6,572,168 B1 | 6/2003 | Radstake | |
| 6,669,258 B1 | * 12/2003 | Kato | ......................... 296/37.8 |

* cited by examiner

Primary Examiner—Jason Morrow
(74) Attorney, Agent, or Firm—Honigman Miller Schwartz and Cohn LLP (57) ABSTRACT

An overhead storage assembly is disclosed. The overhead storage assembly comprises a tray, a housing structure, and a first and second pair of track members. The first pair of track members are slidably moveable with respect to the housing structure. The second pair of track members are slidably moveably with respect to the first pair of track members. The tray is attached to the second pair of track members. A method of cycling the overhead storage assembly is also disclosed.

18 Claims, 13 Drawing Sheets

OVERHEAD STORAGE ASSEMBLY

TECHNICAL FIELD

The present invention relates to vehicular storage assemblies, and in particular to an overhead storage assembly.

BACKGROUND OF THE INVENTION

It is known that vehicles have been equipped with storage assemblies. Vehicular storage assemblies have been located externally on the vehicle, which are commonly referred to in the art as "roof racks" or "article carriers," that permit a user to secure large items, such as luggage, bicycles, skis, or the like, over the vehicle's outer roof structure, which is exposed to the elements. Vehicular storage assemblies have also been located within a passenger compartment area of the vehicle, such as, for example, a glove box or armrest, to stow smaller items, such as roadmaps, coins, compact discs, or the like.

Passenger compartment storage assemblies have also been located proximate the roof or ceiling, which is commonly referred to in the art as a "headliner," in an overhead configuration relative to the seating position of vehicle occupants. Headliner-located storage assemblies, which have also been referred to in the art as "overhead consoles," are typically fastened to the decorative show surface of the headliner during the vehicle manufacturing process. Overhead consoles typically provide storage bins for stowing other smaller item, such as sunglasses, garage door openers, and the like.

Other known overhead storage assemblies comprise a deployable tray attached to a housing. To deploy the tray from the housing, it has been required to pivot the tray in a first motion about a pair of common pivot points away from the headliner prior to pulling the tray in a second motion so that the operator may deposit or access contents in the tray. Because the design of such conventional assemblies include the pivoting action of the tray in a first motion, the weight of the tray and items stored therein add stress to the pair of common pivot points, which may cause mechanical failure of the assembly. To relieve the stress from the pair of common pivot points, such conventional overhead assemblies require a counterbalance or counter-weight mechanism. Additionally, upon pivotably deploying the tray in the first motion, items stored within the tray may be undesirably ejected or shifted as the tray pivots from a generally horizontal, stowed position to a partially deployed, inclined position. Even further, the counterbalance mechanism adds parts and increases cost of the assembly. Yet even further, the combination of the first pivoting motion and second pulling motion presents an awkward, cumbersome presentation of the tray to the operator.

As such, a need exists for an improved overhead storage assembly that reduces cost, reduces shifting of stored items during tray deployment, and presents a smooth deployment of the tray to the operator.

SUMMARY OF THE INVENTION

The inventors of the present invention have recognized these and other problems associated with overhead storage assemblies. To this end, the inventors have developed an overhead storage assembly comprising a tray, a housing structure, and a first and second pair of track members. The first pair of track members are slidably moveable with respect to the housing structure. The second pair of track members are slidably moveably with respect to the first pair of track members. The tray is attached to the second pair of track members.

A method of cycling the overhead storage assembly is also disclosed.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
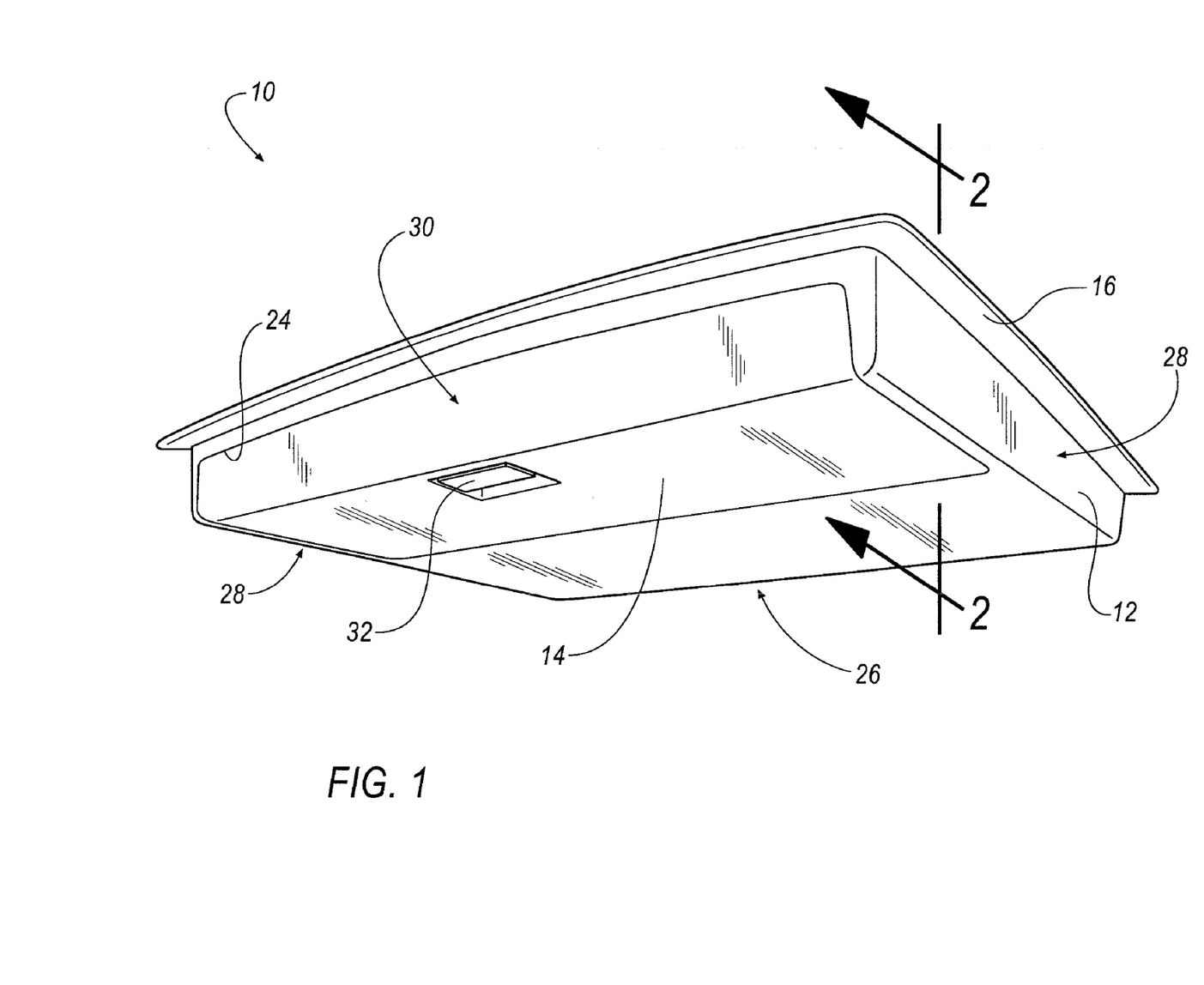
FIG. 1 illustrates a front perspective view of an overhead storage assembly including a tray in a stowed position according to an embodiment of the invention.
Figure 2A:
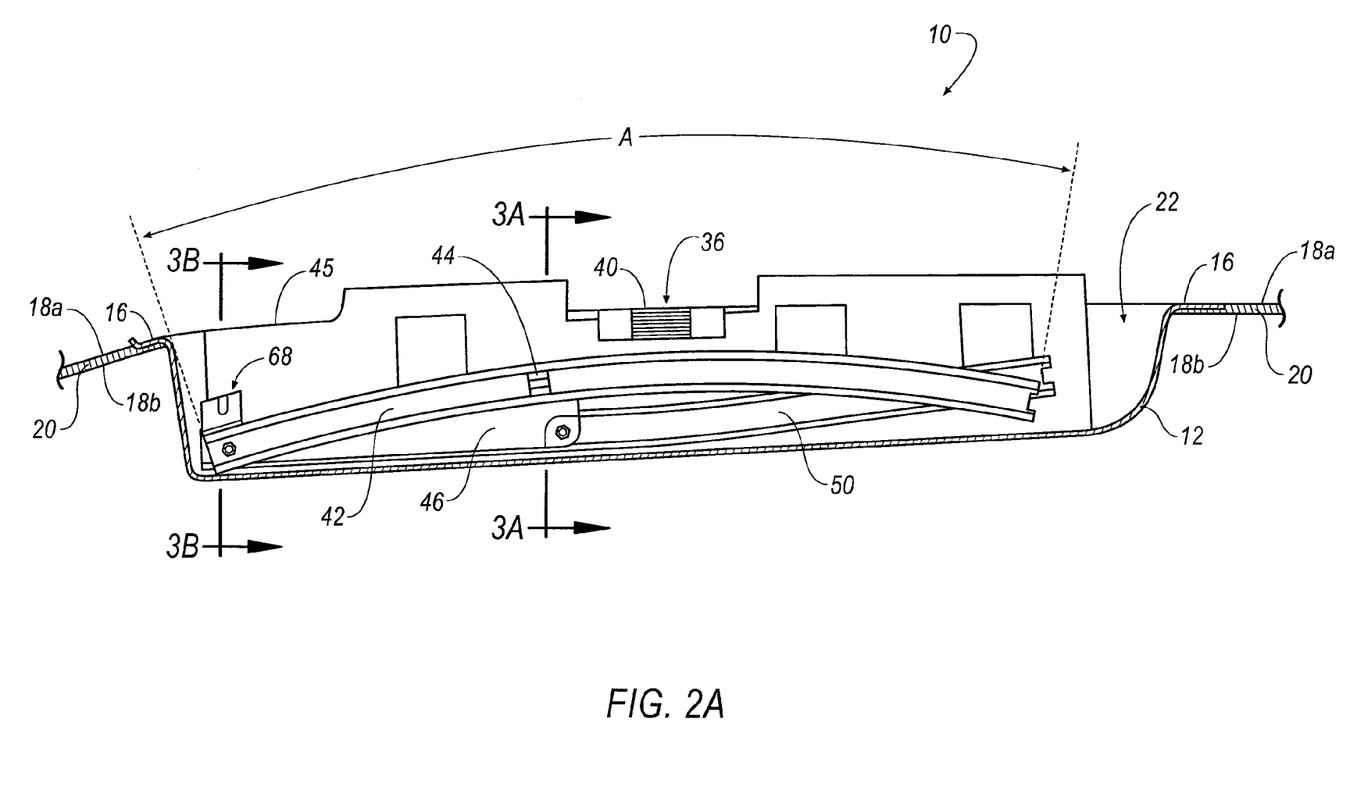
FIG. 2A illustrates a partial cross-sectional view of the storage assembly taken along line 2—2 of FIG. 1.
Figure 2B:
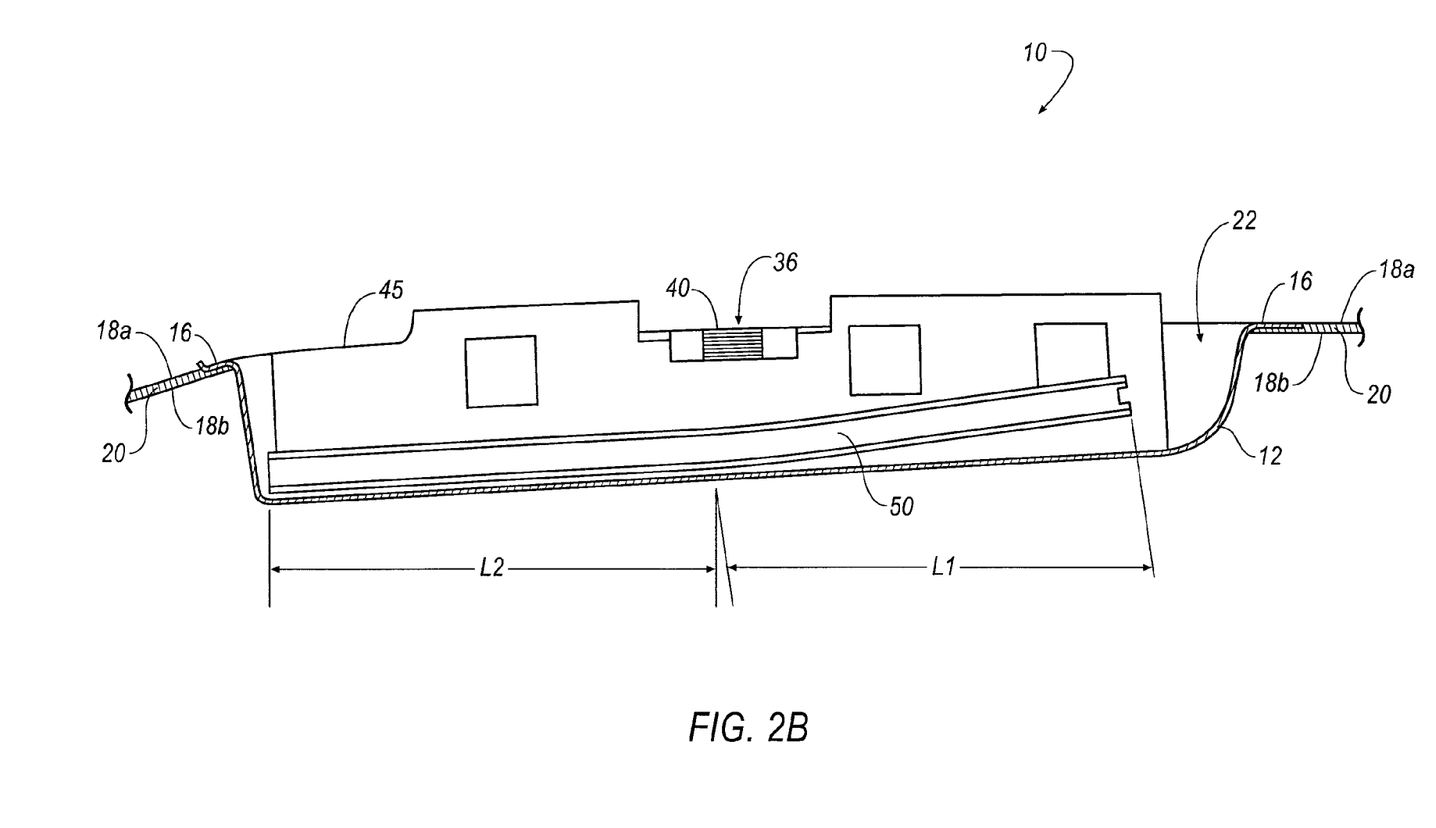
FIG. 2B illustrates a cross-sectional view of the storage assembly taken along line 2—2 of FIG. 1 with a first pair of track members removed for clarity.
Figure 6:
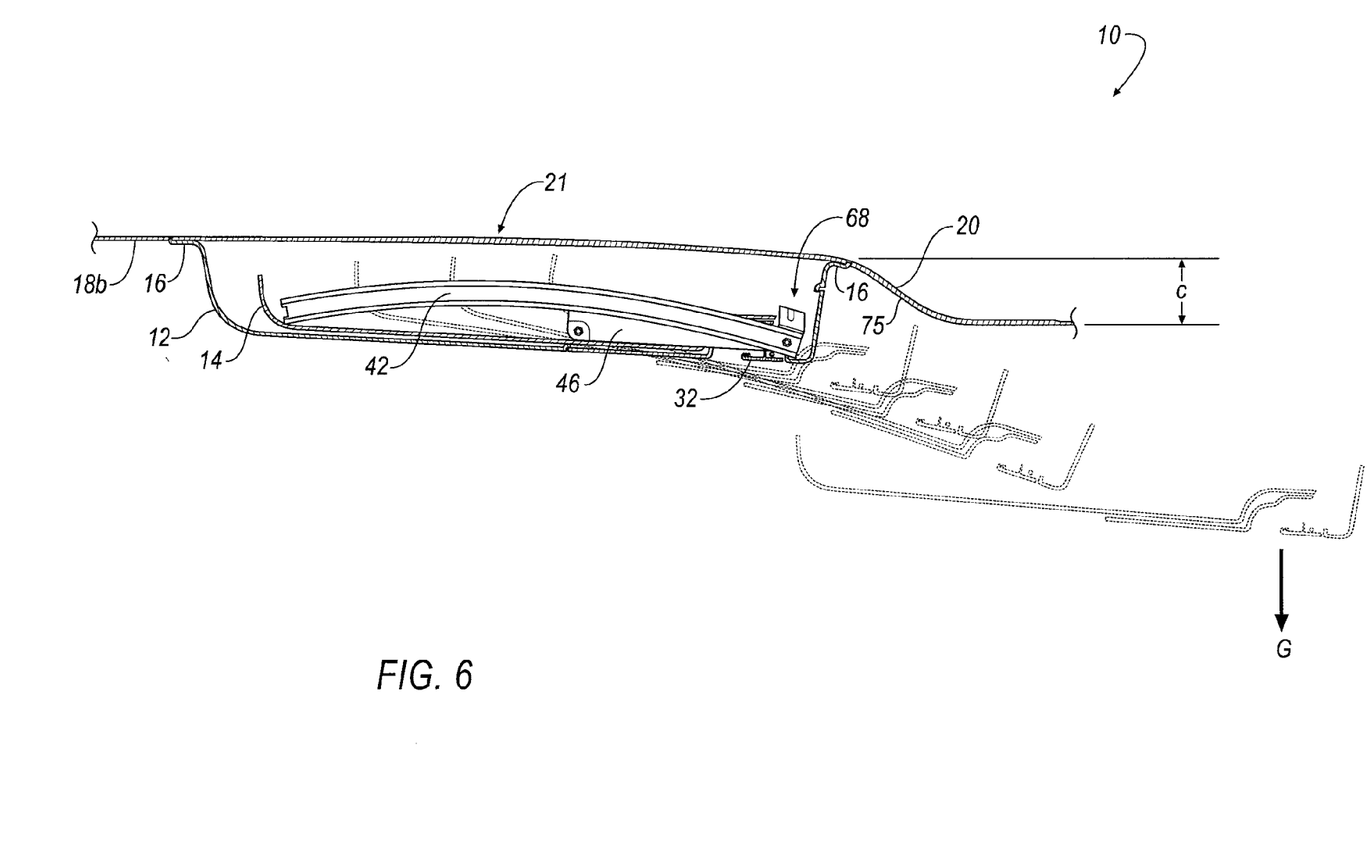
FIG. 6 illustrates a series of deployment positions of the tray FIGS. 4A–4C.

Referring initially to FIGS. 1–2B, an overhead storage assembly is shown generally at 10 according to one embodiment of the invention. The overhead storage assembly 10 includes a housing 12 fixed to a headliner 20 and a tray 14 deployable from the housing 12. The housing 12 includes an upper periphery lip 16 that rests upon and is fastened to an outboard surface 18a of the headliner 20, such that the overhead storage assembly 10 is located within an opening 22 of the headliner 20. Although the overhead storage assembly 10 is located within an opening 22 in the headliner 20, the headliner 20 may not include an opening 22, and, as shown in FIG. 6, for example, the storage assembly 10 may be secured to an inboard surface 18b of the headliner 20.

Referring back to FIG. 1, the tray 14, when in a stowed position, is generally flush with the housing 12 about a seam 24 that encompasses a front surface 30 and a lower surface 26 proximate side-surfaces 28 of the storage assembly 10. If desired, the tray 14 may include a handle 32 that cooperates with a latch mechanism 34 (FIG. 3B) located proximate a tray bezel 35 to permit manual latching of the tray 14 with a pin 38 attached to a housing structure 45. In an alternative embodiment, the latch mechanism 34 may be automatically latched or unlatched by a motor 36 (FIGS. 2A and 2B) via circuitry (not shown).

The motor 36 may also be used to automatically deploy and stow the tray 14 by attaching a flexible member, such as a cable or belt 40, to the tray 14. If attached by a bracket (not shown), the cable 40 may be cinched. Alternatively, if the cable 40 is attached to a pulley (not shown), a spring return or similar device (not shown) would deploy and retract the tray 14 to and from the 'home' position in the housing 12. If a spring return is implemented, the pulley may maintain a 360° rotational effect to wind the cable 40. Additionally, the circuitry may also communicate with a sensor (not shown) to intelligently drive the motor 36 in a manner to cause the cable to draw the tray 14 to the stowed position if a hatchback door (not shown) or the like were to be closed upon the deployed tray 14. In either embodiment described above, the cable 40 may be located within a protective channel and/or secured to any desirable structure of the overhead storage assembly 10.

Figure 3A:
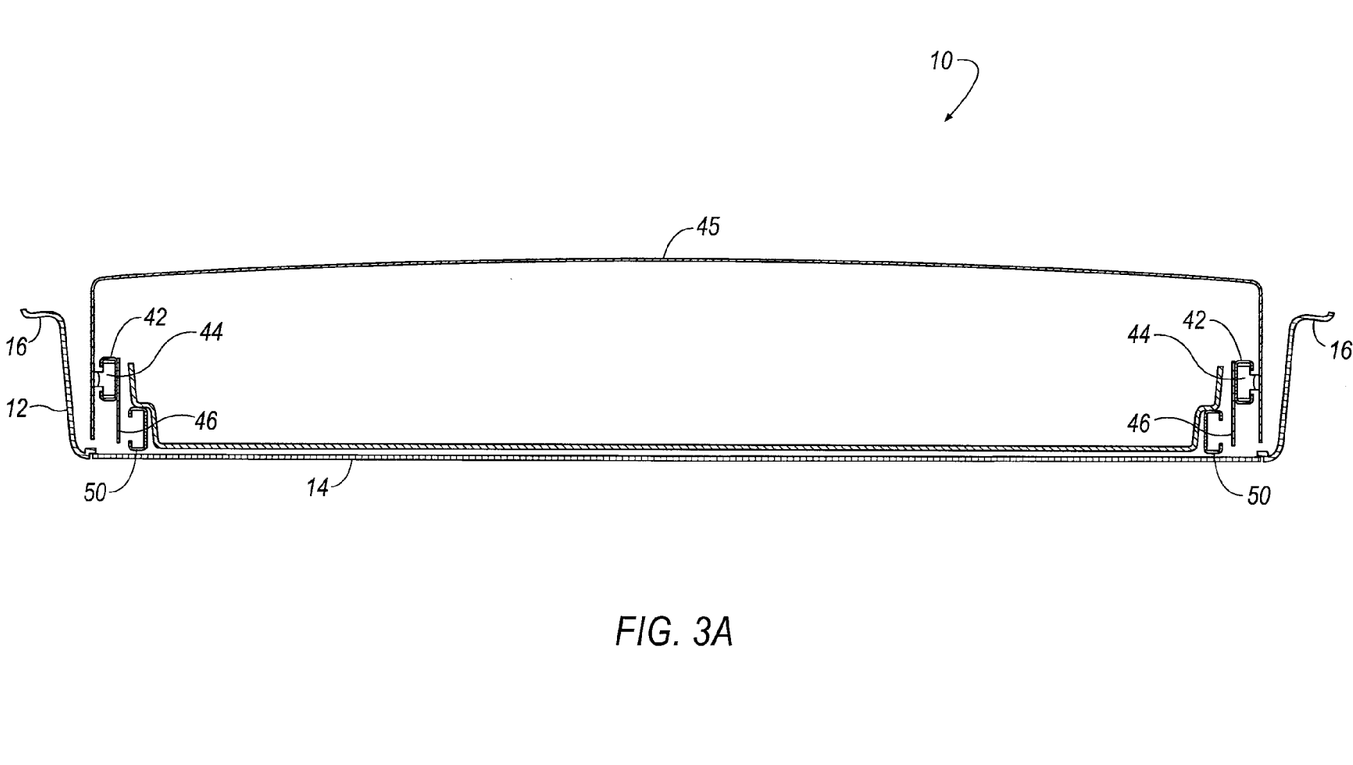
FIG. 3A illustrates front cross-sectional view of the storage assembly taken along line 3A—3A of FIG. 2A.
Figure 3B:
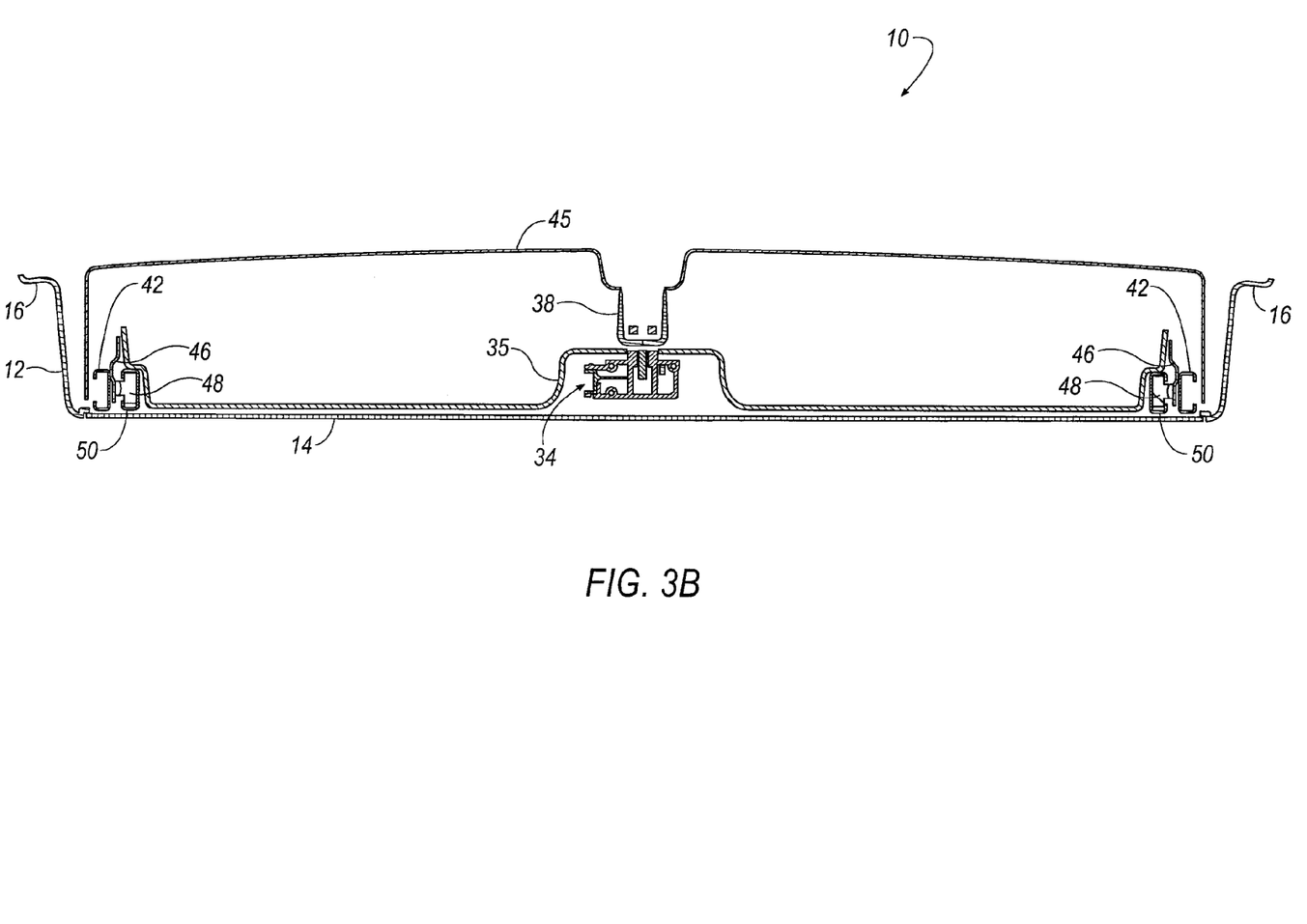
FIG. 3B illustrates front cross-sectional view of the storage assembly taken along line 3B—3B of FIG. 2A.

A first and second pair of track members 42, 50 enable slidable deployment and stowage of the tray 14 from/within the housing 12. Referring initially to FIGS. 2A and 3A, the first pair of arcuate track members 42 are generally C-shaped in cross-section and are adapted to slidably-receive a first bearing assembly 44. The first bearing assembly 44 includes pair of inboard-facing router bearing members that are rotatably mounted to the housing structure 45. As seen in FIG. 3B, each arcuate track member 42 is attached to a bracket member 46. A second bearing assembly 48 is rotatably mounted to the bracket member 46 and includes a pair of inboard-facing bearing members. Referring to FIGS. 2B and 3B, the second pair of track members 50 are attached to the tray 14 and include a first substantially linear length, L1, a second substantially linear length, L2, and are C-shaped in cross-section. The first and second lengths, L1, L2, are slidably-received about the inboard-facing bearing members 48 attached to the arcuate bracket member 46.

Referring to FIGS. 4A–6, the tray 14 is slidably deployed and stowed to and from the housing 12 along a sequencing path. As seen in FIG. 4C, the sequencing path maintains a substantially parallel relationship, as defined by the location of the first and second pairs of tracks 42, 50. Thus, the first and second track members 42, 50, cooperate with each other in such a way so as to cause the tray 14 to be slidably-deployed and stowed from the housing 12 along a generally sinusoidal path, P, as shown in FIG. 6A.

Figure 6A:
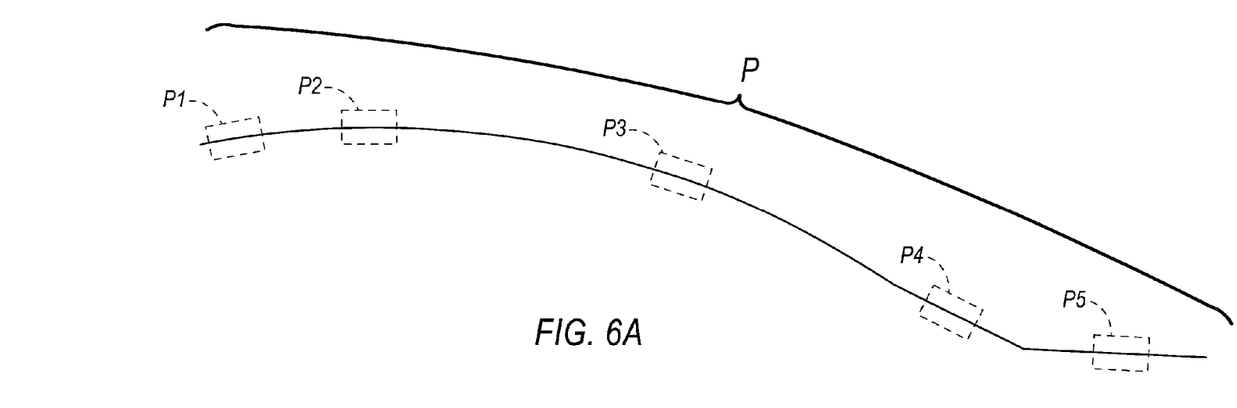
FIG. 6A illustrates a sequencing path of tray movement FIG. 6.

As seen in FIG. 6A, when the tray 14 is deployed from the housing 12, the tray 14 is sequenced from a first position, P1, to a second position, P2, to a third position, P3, as the tray 14 moves along the first pair of tracks 42. As illustrated, the tray 14 is moved from a positive slope at the first position, P1, to a zero slope at the second position, P2, to a negative slope at the third position, P3, which is referenced from an upper portion 21 of the headliner 20. The upper portion 21 of the headliner 20 forms a reference slope of approximately zero degrees.

Accordingly, the controlled movement of the tray 14 from the first position, P1, to the third position, P3, causes the tray 14 to deploy away from a generally horizontal, zero-slope position of the housing 12 to a substantially negative slope position, which is seen in FIG. 6, as the tray 14 is advanced from the stowed position in the housing 16 to a deployed position (in phantom). Accordingly, the negative slope deployment allows the tray 14 to drop below a contour 75 of the headliner 20 at a clearance, C, that would otherwise interfere with the deployment of the tray 14 if the tray 14 was to be deployed substantially parallel to the headliner 20. As illustrated, the contour 75 is a "rear header" of the vehicle proximate a pivotably-deployed hatchback door (not shown).

In addition to providing a deployment clearance, C, the shape of the arcuate track member 42 permits deployment of the tray 14 at a negative slope that does not sharply deviate to a generally vertical, inclined position. As such, because the tray 14 is deployed at angle approximately between $-15°$ and $0°$ (or nearly horizontal) such that items located on a storage surface 15 (FIG. 7) of the tray 14 are less likely to fall from an aft end 56 to a fore end 58 of the tray 14. If desired, the storage surface 15 may be lined with a frictional surface, such as a rubber matting, or the like, to increase the frictional constant of the storage surface 15 so as to further limit the shifting of items stored in the tray 14. Additionally, the rubber matting may further reduce noise and vibration during vehicle operation.

Referring back to FIG. 6A, once the tray 14 has been fully extended about the first pair of track members 42 to an intermediate position (FIG. 4B), further deployment of the tray 14 is sequenced to the second pair of tracks 50. As such, the third position, P3, is sequenced to the forth position, P4, and the forth position, P4, is sequenced to the fifth position, P5. The forth and fifth position, P4, P5, correspond to the first and second linear lengths, L1, L2 (FIG. 2B), of the second pair of tracks 50. As the tray 14 is moved along the first and second linear lengths, L1, L2, the tray 14 still maintains a negative slope. As illustrated, the forth position, P4, includes a negative slope that is greater than the third position, P3, and the fifth position, P5, includes a negative slope that is greater than the forth position, P4.

Accordingly, the second pair of tracks 50 functions in extending the tray 14 from the first pair of tracks 42 to provide the operator with greater access to the tray 14. Additionally, because the tray 14 starts to ramp by increasing the slope of the tray 14 from the third position, P3, to the fifth position, P5, items stored in the tray 14 are less likely to be effected by gravity, which is seen in FIG. 6 at arrow, G, toward the fore end 58 of the tray 14. More specifically, as illustrated in FIG. 6A, although the tray 14 is positioned on a negative slope at the fifth position, P5, the fifth position is nearly parallel to the headliner 20. As a result, because the tray 14 comes to rest at a slightly negative slope in the fully deployed fifth position, P5, the items stored in the tray 14 may be presented to the operator on a generally horizontal plane as the weight of the items and extended tray 14 are maintained by the first and second pairs of tracks 42, 50.

Figure 6B:
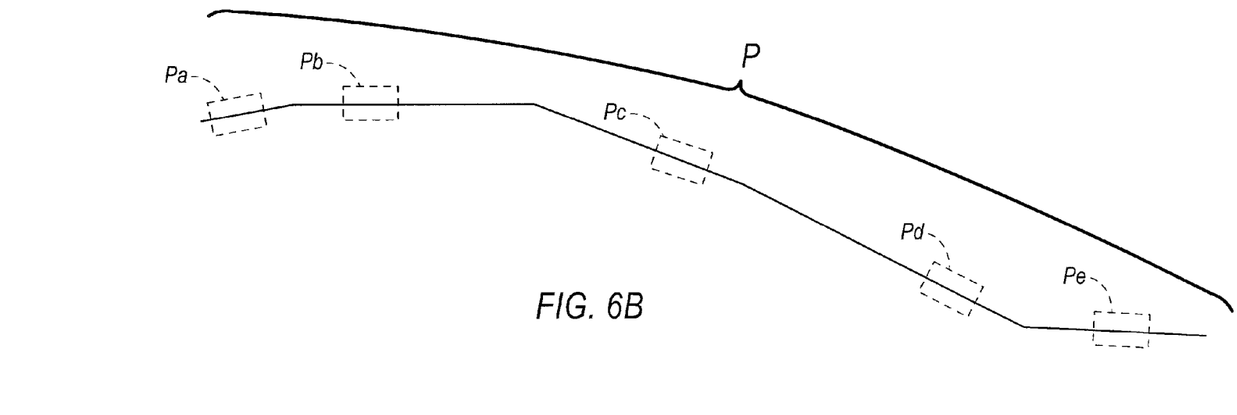
FIG. 6B illustrates a sequencing path of tray movement according to another embodiment of the invention.

In an alternative embodiment as illustrated in FIG. 6B, the tray 14 may be deployed from the housing 12 using any desirable number of track pairs having any desirable shape. For example, although the tray 14 is deployed in a similar manner as shown above with respect to first through fifth positions P1–P5, positions Pa–Pe, are represented on first through fifth linear paths. As such, the first, second, and third positions Pa–Pc may correspond to pairs of first, second, and third linear track members (not shown) as opposed to a single pair of arcuate track members 42 that represents and performs that same function with respect to slope positions as described above in FIG. 6A. Slope positions Pd and Pe may be realized by a substantially similar pair of track members 50, or, alternatively, a forth and fifth pair of linear track members (not shown).

Figures 7, 8A:
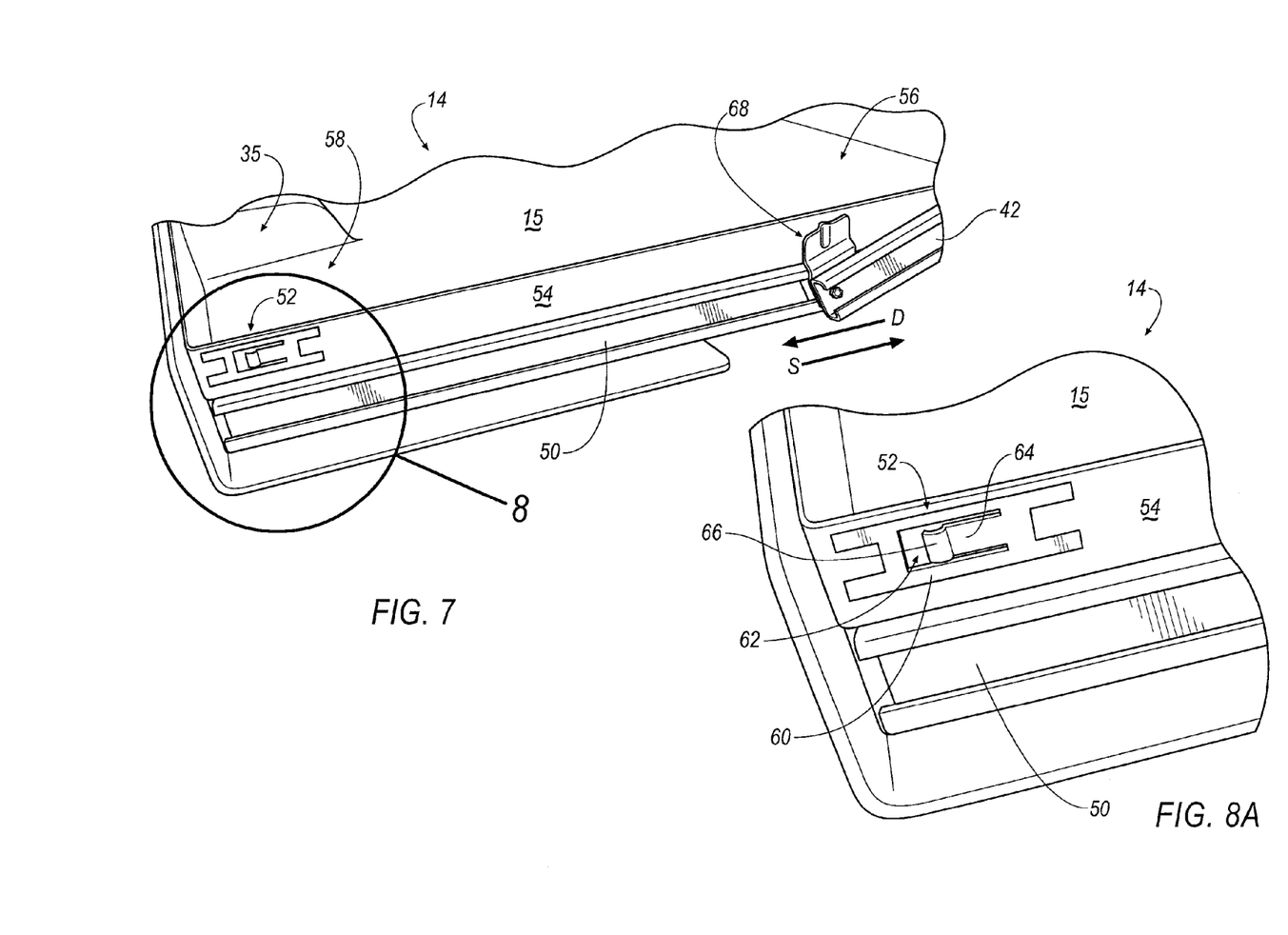
FIG. 7 illustrates a partial overhead perspective view of the tray in the fully deployed position according to FIG. 4C.
FIG. 8A illustrates a magnified view of the tray according to FIG. 7 taken along line 8.

Although the tray slides freely about the track pairs 42, 50, the sequencing of the track pairs 42, 50 are regulated by spring tabs 52, which are shown in FIG. 7. Spring tabs 52 are located on opposing outboard surfaces 54 of the tray 14 at the fore end 58 and an aft end 56. For purposes of describing the operation of the spring tabs 52, a single spring tab 52 is shown in FIG. 7 on one side of the fore end 58.

In accordance with the deployment of the tray 14 in the direction of the arrow, D, as described above along the sequencing path, P, spring tabs 52 located at the aft end 56 of the tray 14 have to be unlatched prior to moving the tray 14 along the first pair of brackets 42 from the first position, P1, to the third position, P3. Then, prior to extending and sequencing the tray 14 to the forth position, P4, spring tabs 52 located at the fore end 58 have to be unlatched.

Accordingly, when the tray 14 is moved back to the housing 12 in the direction of the arrow, S, opposite the deployment direction, D, the spring tabs 52 are regulated back to the latched position. Referring to FIG. 8A, one of the spring tabs 52 at the fore end 58 of the tray 14 is shown in an unbiased position. The spring tab 52 includes a substantially square-shaped periphery 60 fixed about an opening 62 of the tray 14. The spring tab 52 also includes a substantially flat, flexible arm member 64 positioned about the opening 62. The arm member 64 is further defined by a semi-circular detent portion 66 that radially extends outboardly, toward the side-surfaces 28.

Figures 8B, 8C:
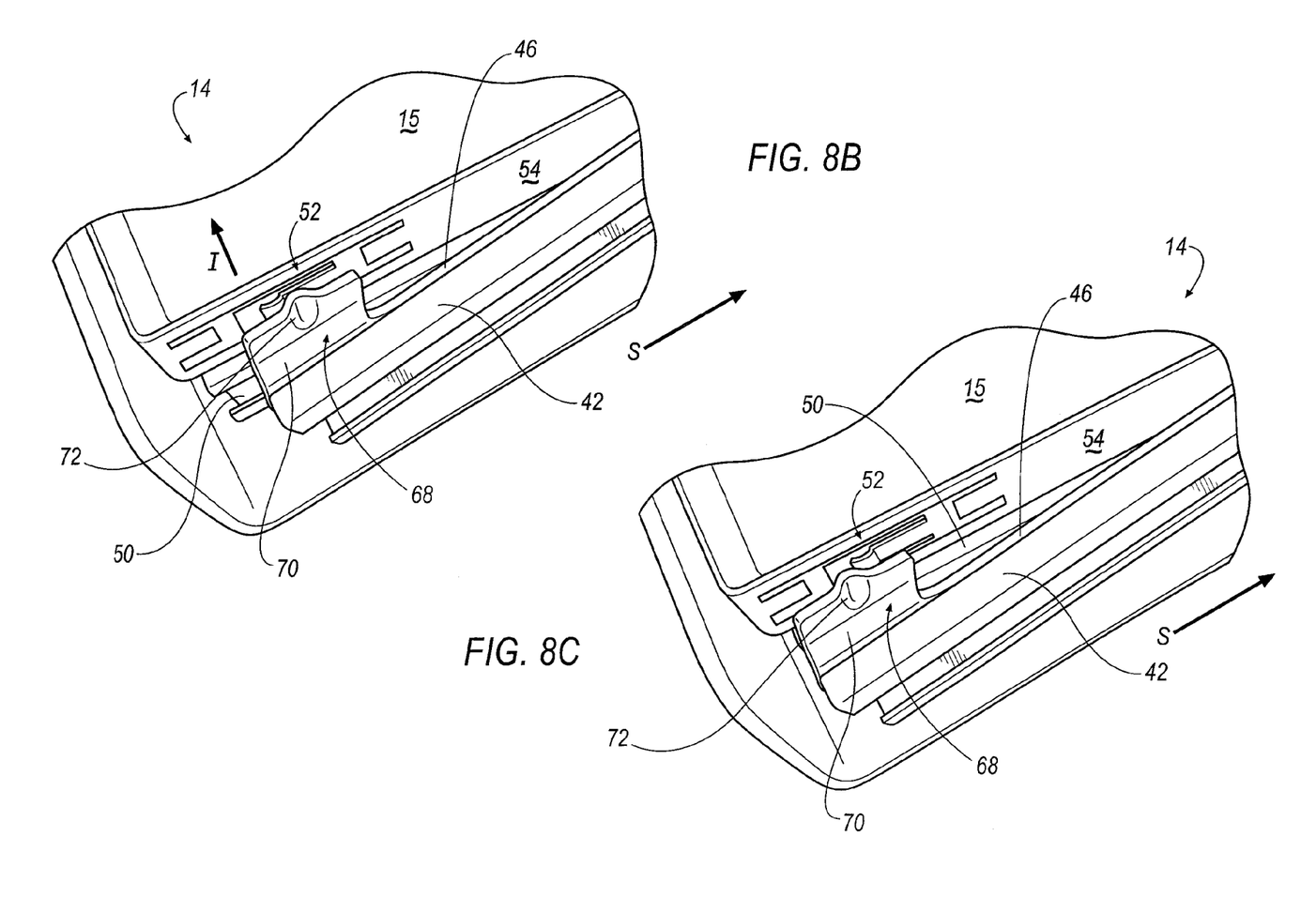
FIG. 8B illustrates another magnified view of the tray in a second configuration according FIG. 8A.
FIG. 8C illustrates another magnified view of the tray in a third configuration according to FIG. 8B.

Referring to FIG. 8B, upon moving the tray 14 in the direction of the arrow, S, the spring tab 52 comes into contact with a rigid tab member 68 that extends from the arcuate bracket member 46. The rigid tab member 68 includes a substantially flat surface 70 and an intermediate, semi-circular detent portion 72 that radially extends inboardly toward the spring tab 52. The semi-circular detent portion 72 abuts the semi-circular detent portion 66, causing the arm member 64 to flex inwardly about the opening 62 in the direction of the arrow, 1. As seen in FIG. 8C, upon further movement of the tray 14 in the direction of the arrow, S, the semi-circular detent portion 72 moves past the semi-circular detent portion 66 of the spring tab 52, thereby latching and regulating movement of the second pair of tracks 50 with respect to the first pair of tracks 42.

Figure 4A:
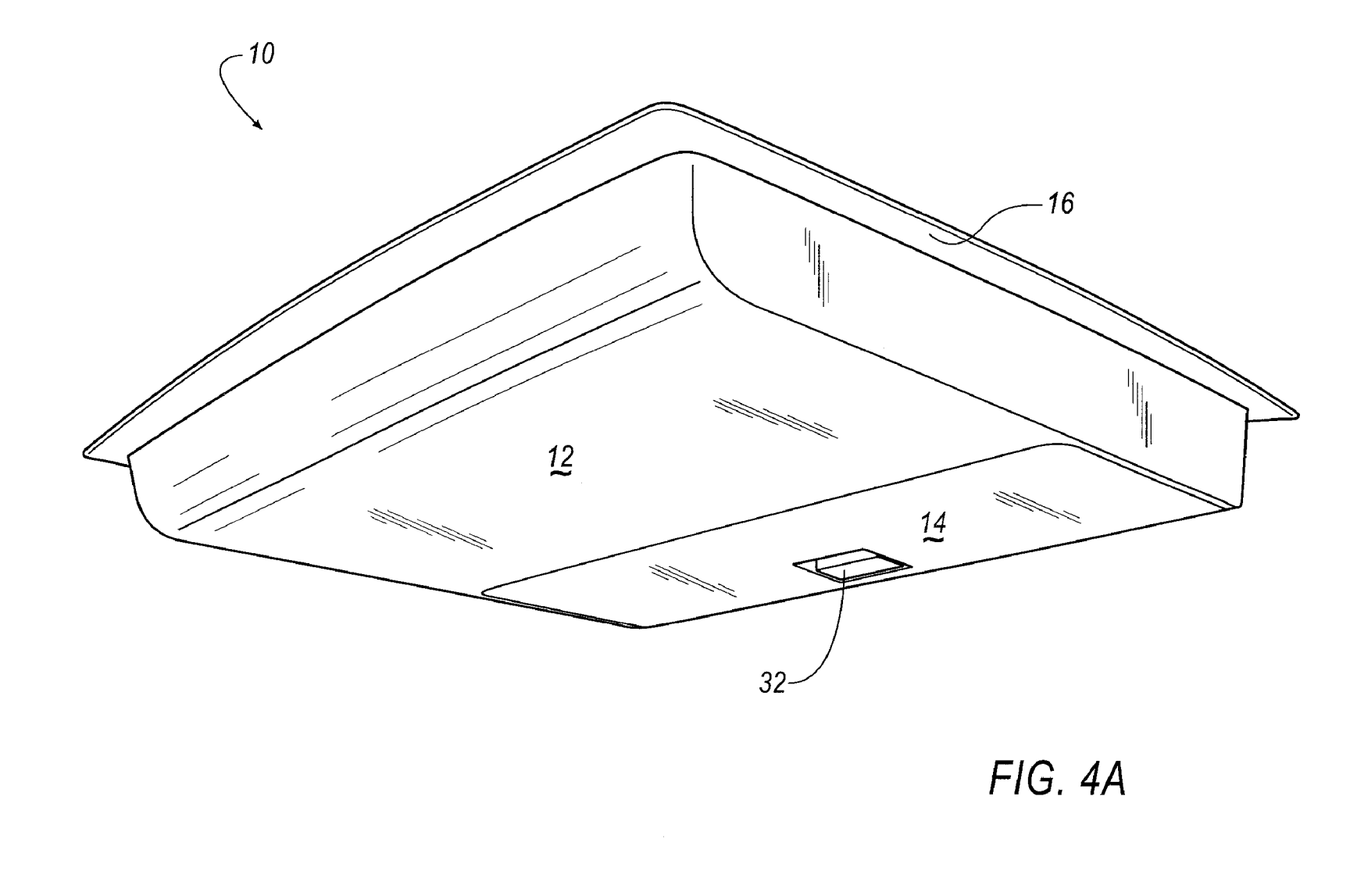
FIG. 4A illustrates a rear perspective view of the overhead storage assembly FIG. 1.
Figure 4B:
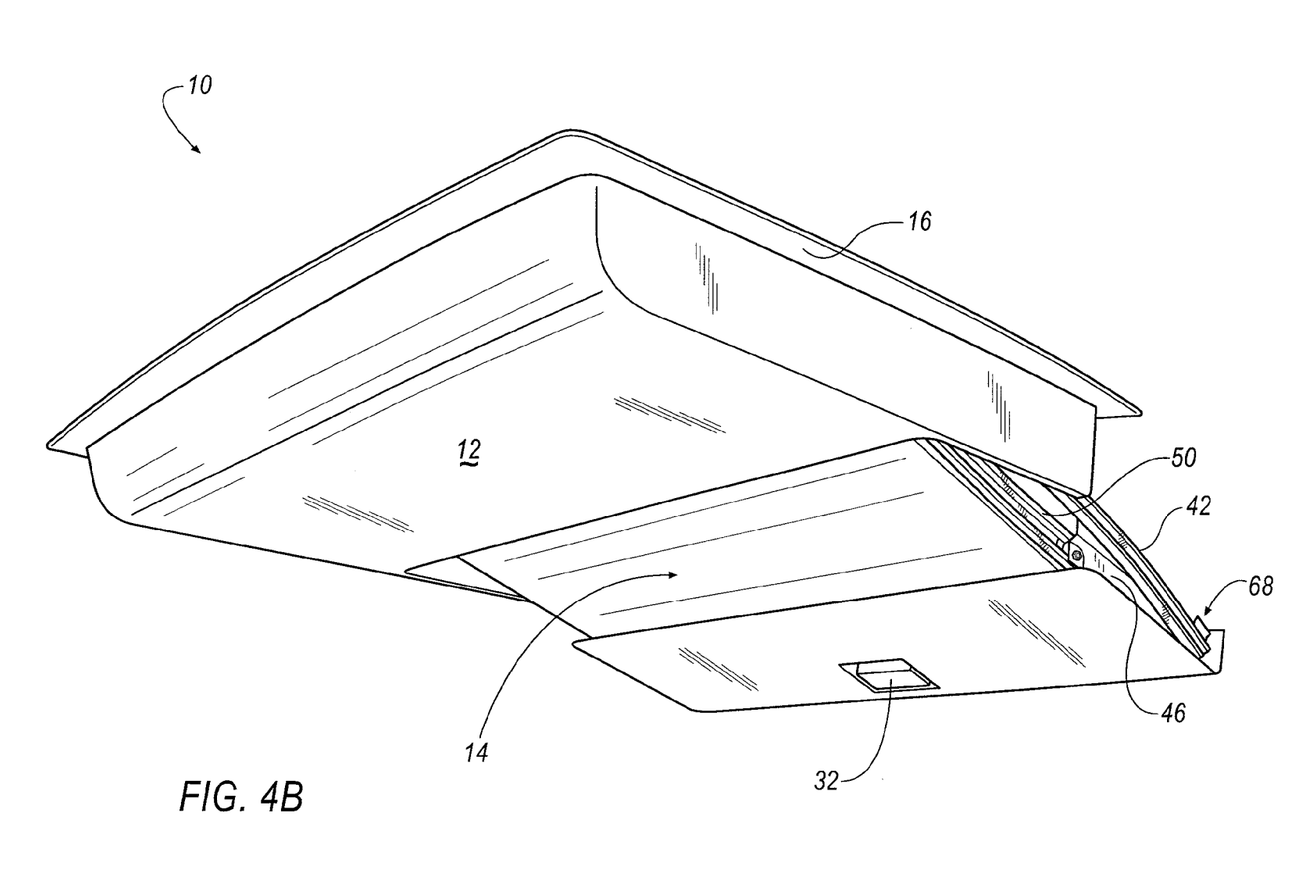
FIG. 4B illustrates a rear perspective view of the overhead storage assembly FIG. 4A with the tray in a partially deployed position.
Figure 4C:
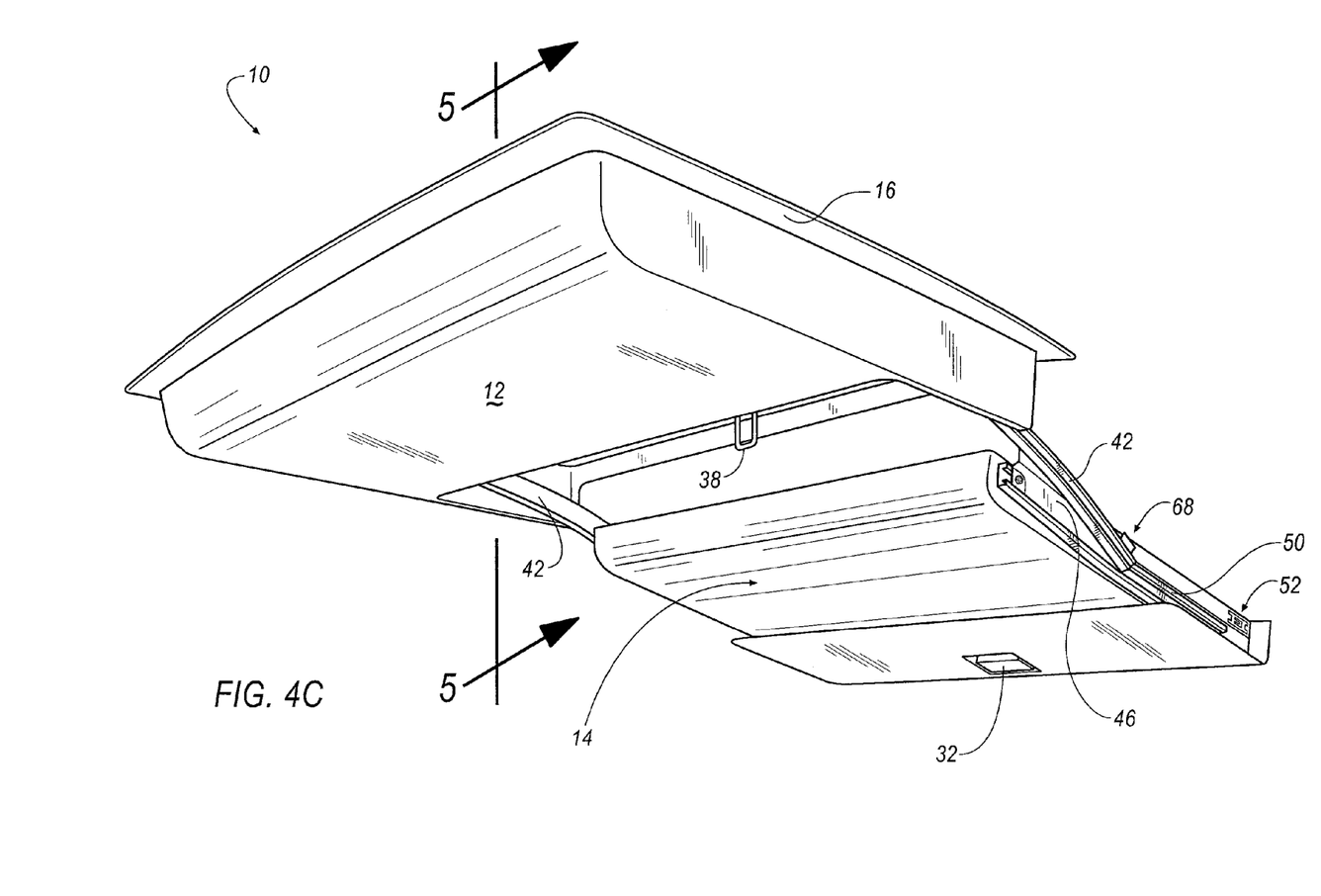
FIG. 4C illustrates a rear perspective view of the overhead storage assembly FIG. 4B with the tray in a fully deployed position.
Figure 5:
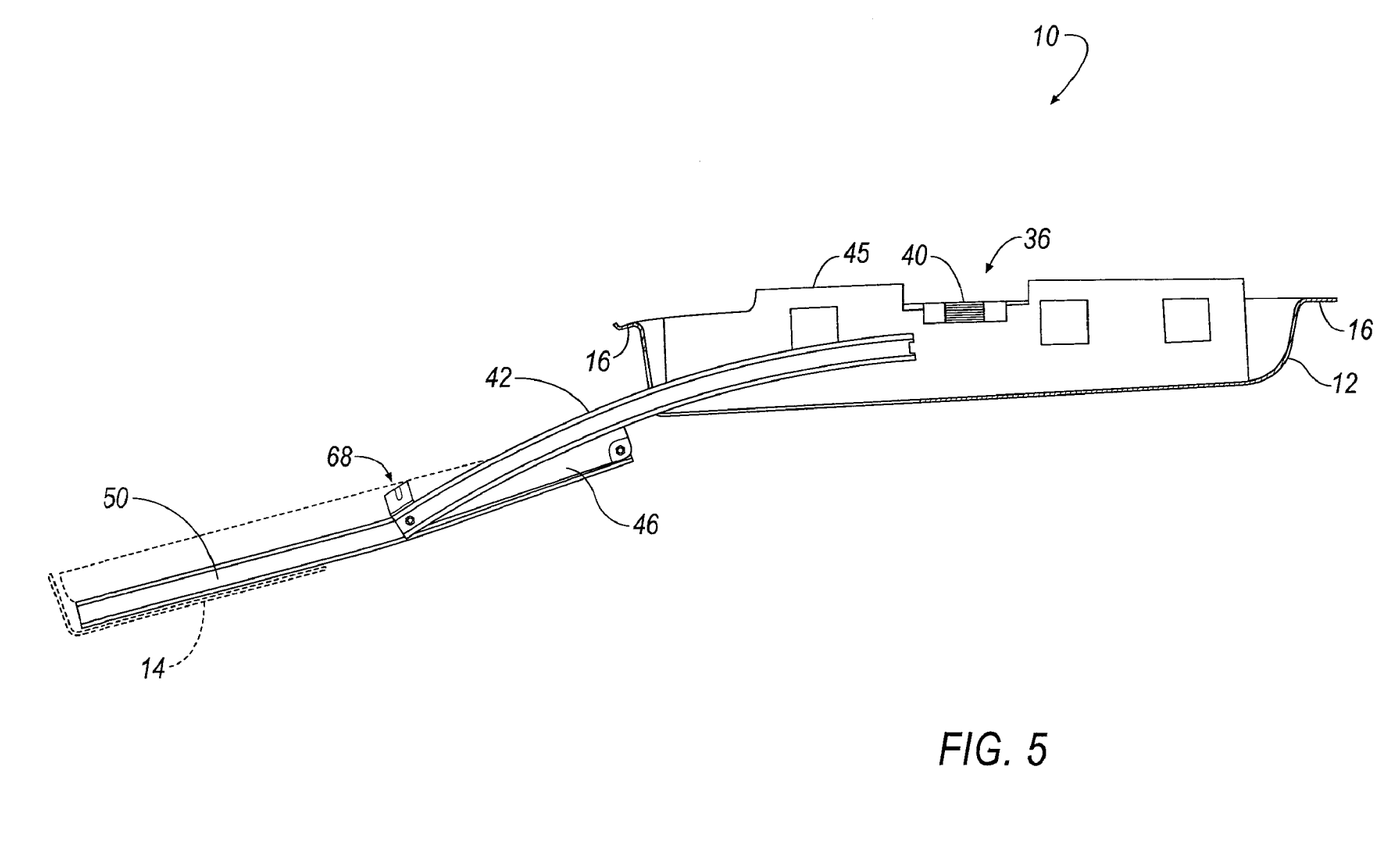
FIG. 5 illustrates a cross-sectional view of the storage assembly FIG. 4C taken along line 5—5.

Upon latching the spring tabs 52 at the fore end 58, the tray 14 has been sequenced from the fully deployed position (FIG. 4C) back to the intermediate position (FIG. 4B). Then, upon advancing the tray 14 from the intermediate position in FIG. 4B back to the fully stowed position (FIG. 4A), the pair of spring tabs 52 at the aft end 56 are latched in a similar manner as described above within the housing 12. Although not illustrated, a second pair of rigid tab members 68 may be integrally-formed, fastened or welded to an aft end of the housing structure 45.

Because the storage assembly 10 is presented to a user on a negative slope in a nearly horizontal position, items may be stowed on the tray surface 15 in a desired position with minimal interference from gravity, G, that would causes an undesirable shift in the positioning of the items from the aft end 56 to the fore end 58. Even further, because the tray 14 is slidably-received about the pair of common, parallel first and second tracks 42, 50 the weight of the tray 14 and applied load of stored items is maintained without the need for additional counterweight mechanisms. Thus, the inventive overhead storage assembly 10 described above reduces cost, reduces shifting of stored items during deployment, and presents a smooth deployment of the tray 14 to the operator.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. An overhead storage assembly, comprising:
   a housing structure;
   a first pair of track members slidably moveable with respect to the housing structure;
   a second pair of track members slidably moveably with respect to the first pair of track members; and
   a tray attached to the second pair of track members.

2. The overhead storage assembly according to claim 1, wherein the first pair of track members each have a length that is arcuate in shape.

3. The overhead storage assembly according to claim 2, wherein the second pair of track members each have a first length that is substantially linear in shape.

4. The overhead storage assembly according to claim 3, wherein the housing structure is attached to a headliner having a reference slope approximately equal to zero, and wherein the first pair of track members includes a positive slope, a zero slope, and a first negative slope, and wherein the first linear length of the second pair of track members has a second negative slope.

5. The overhead storage assembly according to claim 4, wherein the second negative slope is substantially equal to the reference slope of the headliner.

6. The overhead storage assembly according to claim 4, wherein the second pair of track members each include a second linear length.

7. The overhead storage assembly according to claim 6, wherein the second linear length includes a third negative slope with respect to the reference slope of the headliner.

8. The overhead storage assembly according to claim 7, wherein the third negative slope is substantially parallel to the reference slope of the headliner.

9. The overhead storage assembly according to claim 7, wherein the second negative slope is greater than the first negative slope, and wherein the third negative slope is greater than the second negative slope.

10. The overhead storage assembly according to claim 4, further comprising a tray housing, wherein the tray housing is located within an opening of the headliner such that an upper periphery lip of the tray housing rests upon an outboard surface of the headliner.

11. The overhead storage assembly according to claim 4, wherein the tray housing is fastened to an inboard surface of the headliner.

12. The overhead storage assembly according to claim 1, wherein the tray further comprises a latch mechanism located within a tray bezel that mechanically communicates with a handle located proximate a lower surface to permit manual unlatching of the tray from a pin attached to the housing structure.

13. The overhead storage assembly according to claim 1, wherein the housing structure further comprises a motor for driving a flexible member to automatically deploy the tray from a stowed position to a deployed position.

14. The overhead storage assembly according to claim 1, further comprising a pair of bracket members, and wherein the housing structure further comprises two pairs of rigid tab members including a substantially flat surface and an intermediate, semi-circular detent portion that bias two pairs of spring tabs located on opposing outboard surfaces at a fore end and an aft end of the tray to regulate deployment of the tray.

15. An overhead storage assembly, comprising:
   a housing structure;
   a first pair of arcuate track members slidably moveable with respect to the housing structure by a first pair of bearings;
   a pair of bracket members attached to the first pair of arcuate track members;
   a second pair of track members each including a first linear portion, and a second linear portion, wherein the second pair of track members are slidably moveable with respect to the pair of bracket members by a second pair of bearings; and
   a tray attached to the second pair of track members.

16. The overhead storage assembly according to claim 15, further comprising a headliner having a reference slope, and wherein the pair of arcuate track members includes a positive slope, a zero slope, and a first negative slope with respect to the reference slope, and wherein the first linear portion includes a second negative slope with respect to the reference slope, and the second linear portion includes a third negative slope with respect to the reference slope.

17. The overhead storage assembly according to claim 16, wherein the second negative slope is greater than the first negative slope, and wherein the third negative slope is greater than the second negative slope.

18. The overhead storage assembly according to claim 16, wherein the third negative slope is substantially equal to the reference slope of the headliner.

* * * * *